(12) United States Patent
Zeng et al.

(10) Patent No.: US 11,844,036 B2
(45) Date of Patent: *Dec. 12, 2023

(54) TERMINAL SYNCHRONIZATION METHOD AND TERMINAL

(71) Applicant: Huawei Technologies Co., Ltd., Shenzhen (CN)

(72) Inventors: Yongbo Zeng, Shenzhen (CN); Bin Liu, Shenzhen (CN); Yu Cai, Beijing (CN); Jian Wang, Beijing (CN); Guorong Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,847

(22) Filed: Aug. 8, 2022

(65) Prior Publication Data
US 2022/0386254 A1 Dec. 1, 2022

Related U.S. Application Data

(63) Continuation of application No. 17/000,902, filed on Aug. 24, 2020, now Pat. No. 11,452,055, which is a
(Continued)

(51) Int. Cl.
H04W 56/00 (2009.01)
H04W 76/14 (2018.01)
(Continued)

(52) U.S. Cl.
CPC .......... H04W 56/001 (2013.01); H04W 4/46 (2018.02); H04W 56/00 (2013.01);
(Continued)

(58) Field of Classification Search
CPC ... H04W 56/00; H04W 72/12; H04W 56/001; H04W 72/0453; H04W 16/28; H04W 72/04; H04L 5/14
See application file for complete search history.

(56) References Cited

U.S. PATENT DOCUMENTS

2015/0117375 A1 4/2015 Sartori et al.
2015/0264588 A1 9/2015 Li et al.
(Continued)

FOREIGN PATENT DOCUMENTS

CN 102440031 A 5/2012
CN 103582077 A 2/2014
(Continued)

OTHER PUBLICATIONS

Huawei, et al., "D2D synchronization procedure for out-of-coverage," 3GPP TSG RAN WG1 Meeting #78, R1-142845, Aug. 18-22, 2014, 7 pages.
(Continued)

Primary Examiner — Iqbal Zaidi
(74) Attorney, Agent, or Firm — Conley Rose, P.C.

(57) ABSTRACT

A terminal synchronization method and a terminal relate to the communications field, where the terminal sends synchronization signals in a distributed manner by controlling a sequence for sending the synchronization signals such that terminals in a vehicle to vehicle communications system can have uniform timing. The method includes obtaining, by a terminal, a configurable transmission period for sending a first synchronization signal, and sending, by the terminal, the first synchronization signal based on the configurable transmission period.

20 Claims, 11 Drawing Sheets

Related U.S. Application Data continuation of application No. 16/301,340, filed as application No. PCT/CN2016/082130 on May 13, 2016, now Pat. No. 10,959,198.

(51) Int. Cl.
  *H04W 4/46* (2018.01)
  *H04W 88/02* (2009.01)
  *H04W 88/04* (2009.01)

(52) U.S. Cl.
  CPC ....... *H04W 56/0045* (2013.01); *H04W 76/14* (2018.02); *H04W 88/023* (2013.01); *H04W 88/04* (2013.01)

(56) References Cited

U.S. PATENT DOCUMENTS

| | | |
|---|---|---|
| 2015/0327191 A1 | 11/2015 | Park et al. |
| 2016/0007167 A1 | 1/2016 | Vandwalle et al. |
| 2016/0029334 A1 | 1/2016 | Chang et al. |
| 2016/0087738 A1 | 3/2016 | Jeon et al. |
| 2016/0286506 A1 | 9/2016 | Chae et al. |
| 2017/0012753 A1 | 1/2017 | Kim et al. |
| 2017/0013578 A1 | 1/2017 | Wei et al. |
| 2017/0134146 A1 | 5/2017 | Chae et al. |
| 2017/0230923 A1 | 8/2017 | Huang et al. |
| 2017/0331620 A1* | 11/2017 | Tsai .................... H04L 7/042 |
| 2018/0227971 A1* | 8/2018 | Yasukawa ............ H04W 76/14 |
| 2018/0309612 A1* | 10/2018 | Kim .................... H04L 27/2692 |

FOREIGN PATENT DOCUMENTS

| | | |
|---|---|---|
| CN | 104219758 A | 12/2014 |
| CN | 2015026544 A2 | 2/2015 |
| CN | 2015065017 A1 | 5/2015 |
| CN | 104811925 A | 7/2015 |
| CN | 104969633 A | 10/2015 |
| CN | 105517139 A | 4/2016 |
| WO | 2015111851 A1 | 7/2015 |
| WO | 2015111908 A1 | 7/2015 |
| WO | 2015168931 A1 | 11/2015 |
| WO | 2015194830 A1 | 12/2015 |
| WO | 2016014219 A1 | 1/2016 |
| WO | 2016019734 A1 | 2/2016 |
| WO | 2016049270 A2 | 3/2016 |

OTHER PUBLICATIONS

LG Electronics, et al., "New WI proposal: Support for V2V services based on LTE sidelink," 3GPP TSG RAN Meeting #70, RP-152293, Dec. 7-10, 2015, 8 pages.

"3rd Generation Partnership Project; Technical Specification Group Radio Access Network; Evolved Universal Terrestrial Radio Access (E-UTRA); Radio Resource Control (RRC); Protocol specification; (Release 13)," 3GPP TS 36.331 V13.1.0, Mar. 2016, 551 pages.

R1-142160, LG Electronics, Discussion on D2D signal transmission and reception timing, 3GPP TSG RAN WG1 Meeting #77, Seoul, Korea, May 19-23, 2014, total 7 pages. XP050789280.

* cited by examiner

TERMINAL SYNCHRONIZATION METHOD AND TERMINAL

CROSS-REFERENCE TO RELATED APPLICATIONS

This is a continuation of U.S. patent application Ser. No. 17/000,902 filed on Aug. 24, 2020, which is a continuation of U.S. patent application Ser. No. 16/301,340 filed on Nov. 13, 2018, now U.S. Pat. No. 10,959,198, which is a U.S. National Stage of International Patent Application No. PCT/CN2016/082130 filed on May 13, 2016. All of the aforementioned applications are hereby incorporated by reference in their entireties.

TECHNICAL FIELD

This application relates to the communications field, and in particular, to a terminal synchronization method and a terminal.

BACKGROUND

An Internet of Vehicles technology based on a Long Term Evolution (English full name: Long Term Evolution, English abbreviation: LTE) technology includes vehicle to vehicle (English full name: Vehicle to Vehicle, English abbreviation: V2V) communications, vehicle to pedestrian (English full name: Vehicle to Pedestrian, English abbreviation: V2P) communications, and vehicle to infrastructure (English full name: Vehicle to Infrastructure, English abbreviation: V2I) communications, which are collectively referred to as V2X (Vehicle to X). The V2V communications technology is an evolution of a Long Term Evolution-device to device (English full name: Long Term Evolution Device to Device, English abbreviation: LTE-D2D) communications technology. Vehicle to vehicle communications has higher requirements such as a fast moving speed, a small delay, and high communication reliability. Then synchronization between terminals is a precondition for meeting the requirements.

In an existing LTE-D2D system, it is assumed that a first terminal needs to simultaneously receive signals from a plurality of other terminals, but a terminal, such as a second terminal shown in FIG. 1, of the plurality of terminals may be located out of a coverage area of a cellular network to which the first terminal is connected. To ensure synchronization between a terminal out of the coverage area of the cellular network and the first terminal and prevent signals of the terminals from interfering with each other, the first terminal usually uses a sidelink synchronization signal (English full name: SideLink Synchronization Signal, English abbreviation: SLSS) to periodically forward a synchronization source with a high priority to the terminal out of the coverage area of the cellular network, so that the terminal out of the coverage area of the cellular network can be synchronized with a terminal in the coverage area of the cellular network.

Further, the terminal located out of the coverage area of the cellular network, or a terminal in an overlapping coverage area of two cellular networks may receive a plurality of SLSSs. For example, a second terminal shown in FIG. 2 is located in an overlapping area of a cellular network coverage area of a first base station and a cellular network coverage area of a second base station. Because a terminal in the LTE-D2D system does not have a high requirement for a delay and communication reliability, the terminal in the overlapping area may select, based on a priority and signal strength of a synchronization source, timing of a synchronization source of a terminal that communicates with the terminal in the overlapping area, to perform synchronization; and ignore received timing of a synchronization source of another terminal. As a result, no terminal in a specific range can be synchronized. However, in a vehicle to vehicle communications system, all terminals in a specific range need to be synchronized, and perform communication with uniform timing.

SUMMARY

An objective of the present invention is to provide a terminal synchronization method and a terminal. A terminal sends synchronization signals in a distributed manner by controlling time points for sending the synchronization signals, so that terminals in a vehicle to vehicle communications system can perform communication with uniform timing at a same time point.

The foregoing objective and other objectives are achieved by using the features in the independent claims. Further implementations are embodied in the dependent claims, the specification, and the accompanying drawings.

According to a first aspect, a terminal synchronization method is provided, including: first, obtaining, by a terminal, a transmission period for sending a first synchronization signal, where the transmission period is used to indicate a time interval between two adjacent synchronization signals sent by the terminal, and the transmission period is a configurable period; and then sending the first synchronization signal based on the transmission period, where the first synchronization signal is a signal corresponding to timing, which has currently been configured for the terminal, of a first synchronization source.

Compared with the prior art in which a transmission period is unconfigurable, according to the terminal synchronization method provided in the first aspect, the transmission period limited in the present invention may be configured randomly, so that different terminals may send synchronization signals by using different transmission periods, and a terminal controls a sequence for sending synchronization signals. This avoids a conflict between synchronization signals sent by synchronization sources with different timing, and therefore terminals in a vehicle to vehicle communications system can have uniform timing at a same time point.

In a first implementation of the first aspect, the method further includes: the terminal may further obtain a starting offset for sending the first synchronization signal, where the starting offset is used to indicate an offset time period of a starting time point at which the terminal starts to send a synchronization signal; and the sending, by the terminal, the first synchronization signal based on the transmission period includes: sending, by the terminal, the first synchronization signal based on the transmission period and the starting offset; or the terminal may further obtain a transmission duration for sending the first synchronization signal, where the transmission duration is used to indicate a duration in which the terminal sends a synchronization signal, and the sending, by the terminal, the first synchronization signal based on the transmission period includes: sending, by the terminal, the first synchronization signal based on the transmission period and the transmission duration; or the terminal may further obtain a starting offset and a transmission duration for sending the first synchronization signal, where the sending, by the terminal, the first synchronization signal based on the transmission period includes: sending, by the terminal, the first synchronization signal based on the transmission period, the starting offset, and the transmission duration.

In this way, the terminal may control a sequence for sending synchronization signals based on any combination of the transmission period, the starting offset, and the transmission duration. This avoids a conflict between synchronization signals sent by synchronization sources with different timing, and therefore terminals in a vehicle to vehicle communications system can have uniform timing at a same time point.

With reference to the first implementation of the first aspect, in a second implementation of the first aspect, before obtaining at least one of the transmission period, the starting offset, and the transmission duration for sending the first synchronization signal, the method further includes: preconfiguring, by the terminal, at least two transmission periods, at least two starting offsets, and at least two transmission durations; or receiving, by the terminal, a system message sent by a base station, where the system message includes at least two transmission periods, at least two starting offsets, and at least two transmission durations. In this way, the terminal may select, from the two transmission periods, the at least two starting offsets, and the at least two transmission durations that have been configured, a parameter required by the terminal for transmitting a synchronization signal.

Optionally, the method may further include any one of the following implementations: before the terminal obtains the transmission period for sending the first synchronization signal, preconfiguring, by the terminal, at least two transmission periods; or receiving, by the terminal, a system message sent by a base station, where the system message includes at least two transmission periods; before the terminal obtains the starting offset for sending the first synchronization signal, preconfiguring, by the terminal, at least two starting offsets; or receiving, by the terminal, a system message sent by a base station, where the system message includes at least two starting offsets; and before the terminal obtains the transmission duration for sending the first synchronization signal, preconfiguring, by the terminal, at least two transmission durations; or receiving, by the terminal, a system message sent by a base station, where the system message includes at least two transmission durations.

The foregoing manners may be combined randomly to send a synchronization signal. Any one of the implementations is not limited in the present invention. For example, before the terminal obtains the transmission period and the starting offset for sending the first synchronization signal, the terminal preconfigures at least two transmission periods and at least two starting offsets; or the terminal receives a system message sent by a base station, where the system message includes at least two transmission periods and at least two starting offsets.

With reference to the second implementation of the first aspect, in a third implementation of the first aspect, the obtaining a transmission period for sending a first synchronization signal includes: obtaining, by the terminal based on a priority of a first synchronization source corresponding to the first synchronization signal, a starting offset corresponding to the first synchronization source that is corresponding to the first synchronization signal; or obtaining, by the terminal based on a location of a first synchronization source corresponding to the first synchronization signal and/or a type of the first synchronization source, a starting offset corresponding to the first synchronization source that is corresponding to the first synchronization signal; the obtaining a starting offset for sending the first synchronization signal includes: obtaining, by the terminal based on a priority of a first synchronization source corresponding to the first synchronization signal, a transmission period corresponding to the first synchronization source that is corresponding to the first synchronization signal; or obtaining, by the terminal based on a location of a first synchronization source corresponding to the first synchronization signal and/or a type of the first synchronization source, a transmission period corresponding to the first synchronization source that is corresponding to the first synchronization signal; or the obtaining a transmission duration for sending the first synchronization signal includes: obtaining, by the terminal based on a priority of a first synchronization source corresponding to the first synchronization signal, a transmission duration corresponding to the first synchronization source that is corresponding to the first synchronization signal; or obtaining, by the terminal based on a location of a first synchronization source corresponding to the first synchronization signal and/or a type of the first synchronization source, a transmission duration corresponding to the first synchronization source that is corresponding to the first synchronization signal.

With reference to the second implementation of the first aspect, in a fourth implementation of the first aspect, the obtaining the starting offset, the transmission period, and the transmission duration for sending the first synchronization signal includes: randomly selecting, by the terminal, one starting offset from the at least two starting offsets; randomly selecting, by the terminal, one transmission period from the at least two transmission periods; or randomly selecting, by the terminal, one transmission duration from the at least two transmission durations.

With reference to the first implementation of the first aspect, in a fifth implementation, the method further includes: receiving, by the terminal, an indication message sent by a base station, where the indication message is used to indicate at least one of the transmission period, the starting offset, and the transmission duration that are used by the terminal.

With reference to any one of the first implementation of the first aspect to the fifth implementation of the first aspect, in a sixth implementation, after the obtaining a starting offset for sending the first synchronization signal, the method further includes: monitoring, by the terminal, a vehicle to vehicle V2V channel within the starting offset; and when the terminal detects a third synchronization signal, and a priority of a third synchronization source corresponding to the third synchronization signal is higher than the priority of the first synchronization source corresponding to the first synchronization signal, canceling, by the terminal, sending the first synchronization signal; or canceling, by the terminal, sending the first synchronization signal, and sending the third synchronization signal.

With reference to any one of the first aspect or the first implementation of the first aspect to the sixth implementation of the first aspect, in a seventh implementation, when the terminal preconfigures the at least two transmission periods, the method includes: adding, by the terminal, the transmission period of the first synchronization signal to a PSBCH for transmission.

With reference to any one of the first aspect or the first implementation of the first aspect to the seventh implementation of the first aspect, in an eighth implementation, when sending the first synchronization signal, the terminal adds a remaining quantity of transmissions to the physical sidelink broadcast channel PSBCH, and the remaining quantity of transmissions is used to indicate a quantity of synchronization signal transmissions subsequently performed by the terminal after transmission of a current synchronization signal ends.

With reference to any one of the first aspect or the first implementation of the first aspect to the eighth implementation of the first aspect, in a ninth implementation, before the obtaining a transmission period for sending a first synchronization signal, the method further includes: determining, by the terminal, that a sending policy is satisfied, where the sending policy includes: the terminal does not detect any other synchronization signal within a preset time period; or the terminal detects a second synchronization signal, and a priority of a second synchronization source corresponding to the second synchronization signal is lower than the priority of the first synchronization source corresponding to the first synchronization signal; or the terminal receives an indication message sent by the base station, and the indication message is used to instruct the terminal to send a synchronization signal, where the base station is a base station on which the terminal camps. This avoids that all terminals in an area send synchronization signals.

According to a second aspect, a terminal synchronization method is provided, including: after receiving a first synchronization signal, forwarding, by a terminal, the first synchronization signal based on a preset time offset, where the time offset is used to indicate a difference between a time at which the terminal receives a synchronization signal and a time at which the terminal forwards the synchronization signal; or generating, by the terminal, a fourth synchronization signal whose sequence is different from a sequence of the first synchronization signal, and then forwarding the fourth synchronization signal, where the fourth synchronization signal and the first synchronization signal are corresponding to same timing of a synchronization source.

According to the terminal synchronization method provided in the second aspect, after receiving a forwarded synchronization signal, the terminal waits for a specific time interval and then sends a synchronization signal, to differentiate the synchronization signal from the original synchronization signal, so that a terminal can identify an error between the original synchronization signal and the forwarded synchronization signal.

According to a third aspect, a terminal is provided, including: an obtaining unit, configured to obtain a transmission period for sending a first synchronization signal, where the transmission period is used to indicate a time interval between two adjacent synchronization signals sent by the terminal, and the transmission period is a configurable period; and a sending unit, configured to send the first synchronization signal based on the transmission period. For a specific implementation, refer to functions of behavior of the terminal in the terminal synchronization method provided in the first aspect.

According to a fourth aspect, a terminal is provided, including: a receiving unit, configured to receive a first synchronization signal; a sending unit, configured to forward the first synchronization signal based on a preset time offset, where the time offset is used to indicate a difference between a time at which the terminal receives a synchronization signal and a time at which the terminal forwards the synchronization signal; and a generation unit, configured to generate a fourth synchronization signal, where a sequence of the fourth synchronization signal is different from a sequence of the first synchronization signal, and the fourth synchronization signal and the first synchronization signal are corresponding to same timing of a synchronization source, where the sending unit is further configured to forward the fourth synchronization signal. For a specific implementation, refer to functions of behavior of the terminal in the terminal synchronization method provided in the second aspect.

According to a fifth aspect, a terminal synchronization method is provided, including: when timing of a first synchronization source corresponding to a first synchronization signal has been configured for a terminal, receiving a second synchronization signal sent by a second synchronization source, where the second synchronization signal is a signal of timing of the second synchronization source corresponding to the second synchronization signal; obtaining, by the terminal, a timing offset between the timing of the first synchronization source and the timing of the second synchronization source; adjusting, by the terminal based on the timing offset, a time point for sending the first synchronization signal; and sending, by the terminal, the first synchronization signal based on an adjusted-to time point. In this way, the terminal adjusts a time point for a to-be-sent synchronization signal, so that when a synchronization source of the terminal remains unchanged, relatively high synchronization precision can be maintained, and interference on another terminal caused by a timing offset can also be reduced.

According to a sixth aspect, a terminal is provided, including: a receiving unit, configured to: when timing of a first synchronization source corresponding to a first synchronization signal has been configured for the terminal, receive a second synchronization signal sent by a second synchronization source, where the second synchronization signal is a signal of timing of the second synchronization source corresponding to the second synchronization signal; an obtaining unit, configured to obtain a timing offset between the timing of the first synchronization source and the timing of the second synchronization source; an adjustment unit, configured to adjust, based on the timing offset, a time point for sending the first synchronization signal; and a sending unit, configured to send the first synchronization signal based on an adjusted-to time point. For a specific implementation, refer to functions of behavior of the terminal in the terminal synchronization method provided in the fifth aspect.

According to a seventh aspect, a terminal synchronization method is provided, including: dividing, into at least two subchannels by a terminal, a V2V channel that transmits a vehicle to vehicle V2V signal; and when the terminal finds an idle subchannel through scanning, sending a synchronization signal and the V2V signal on the idle subchannel; or when the terminal finds no idle subchannel through scanning, selecting a subchannel with smallest signal strength from all of the subchannels, and sending the V2V signal on the subchannel, where the V2V signal includes a synchronization signal.

According to an eighth aspect, a terminal is provided, including: a processing unit, configured to divide, into at least two subchannels, a V2V channel that transmits a vehicle to vehicle V2V signal; and a sending unit, configured to: when the terminal finds an idle subchannel through scanning, send a synchronization signal and the V2V signal on the idle subchannel, where the sending unit is further configured to: when the terminal finds no idle subchannel through scanning, select a subchannel with smallest signal strength from all of the subchannels, and send the V2V signal on the subchannel, where the V2V signal includes a synchronization signal.

It should be noted that the function modules in the foregoing aspects may be implemented by hardware, or may be implemented by hardware executing corresponding software. The hardware or software includes one or more modules corresponding to the foregoing functions, for example, the communications interface configured to implement functions of the receiving unit and the sending unit, the processor configured to implement functions of the processing unit, and a memory configured to store a volume threshold. The processor, the communications interface, and the memory connect to and communicate with each other by using a bus. For details, refer to the functions of the behavior of the terminal in the provided terminal synchronization method.

In the present invention, a name of a terminal constitutes no limitation on devices. In actual implementation, the devices may appear with other names, provided that functions of the devices are similar to those in the present invention, and fall within the scope of the claims of the present invention and equivalent technologies thereof.

These aspects or other aspects of the present invention are clearer and easier to understand in descriptions of the following embodiments.

BRIEF DESCRIPTION OF DRAWINGS

To describe the technical solutions in the embodiments of this application or in the prior art more clearly, the following briefly describes the accompanying drawings required for describing the embodiments or the prior art. Apparently, the accompanying drawings in the following descriptions show merely some embodiments of this application, and a person of ordinary skill in the art may still derive other drawings from these accompanying drawings without creative efforts.

DESCRIPTION OF EMBODIMENTS

The following clearly describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

A basic principle of the present invention lies in: In the present invention, a transmission period may be configured randomly, so that different terminals may send synchronization signals by using different transmission periods, and a terminal sends synchronization signals in a distributed manner, and controls a sequence for sending the synchronization signals. This avoids a conflict between synchronization signals sent by synchronization sources with different timing, and therefore terminals in a vehicle to vehicle communications system can have uniform timing at a same time point.

The following describes in detail the embodiments of the present invention with reference to the accompanying drawings.

Figure 1:
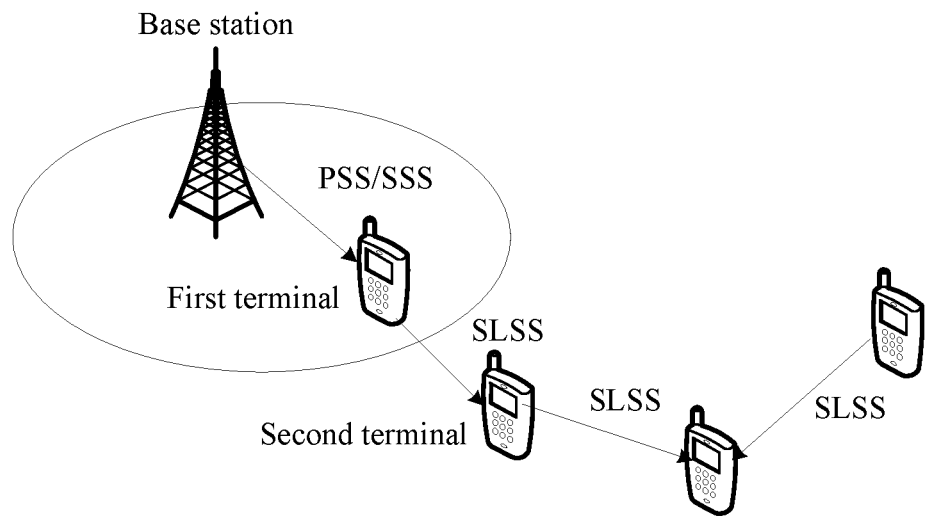
FIG. 1 is a schematic diagram of a communications system in the prior art.
Figure 2:
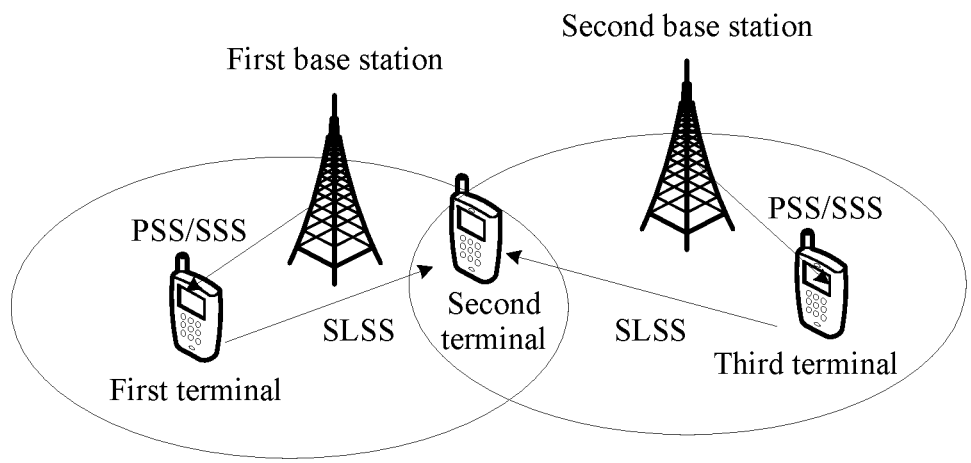
FIG. 2 is a schematic diagram of another communications system in the prior art.
Figure 3:
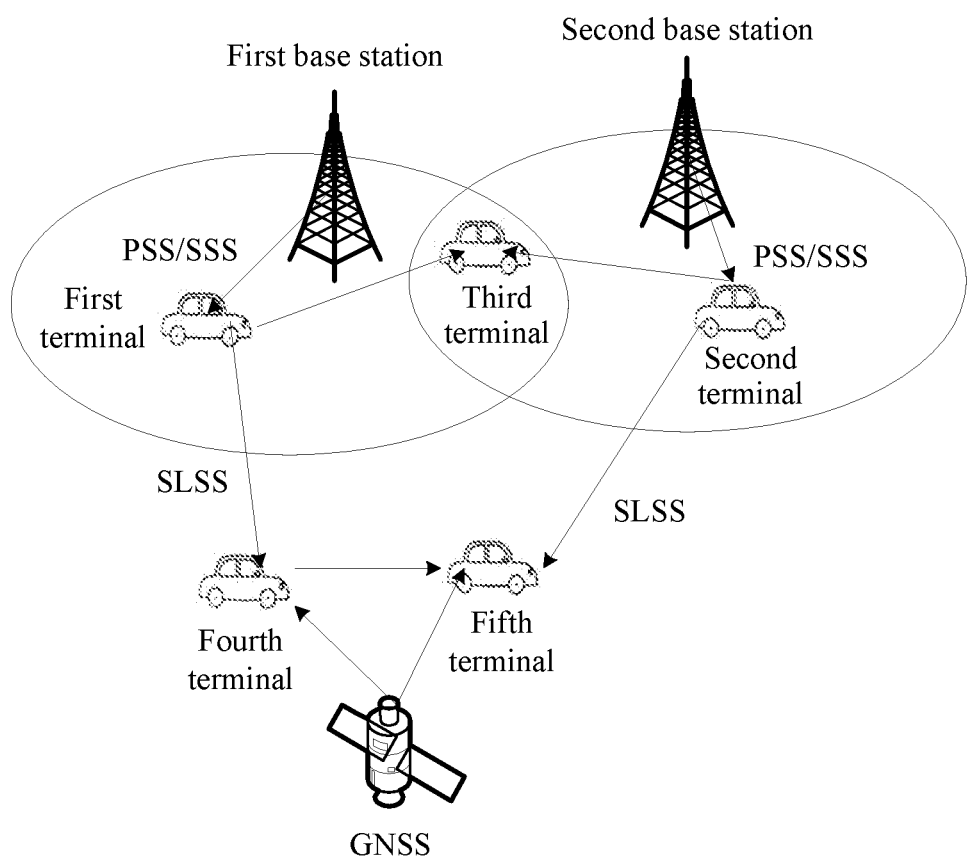
FIG. 3 is a schematic diagram of a communications system according to an embodiment of this application.

An embodiment of the present invention provides a schematic diagram of a communications system. As shown in FIG. 3, the communications system includes a first base station, a second base station, a first terminal, a second terminal, a third terminal, a fourth terminal, and a fifth terminal. The first terminal is a terminal in a coverage area of the first base station. The second terminal is a terminal in a coverage area of the second base station. The third terminal is a terminal in a range of an overlapping area of the first base station and the second base station. The fourth terminal and the fifth terminal are neither terminals in the coverage area of the first base station nor terminals in the coverage area of the second base station.

It should be noted that the first terminal is synchronized with the first base station on which the first terminal camps, and timing of a synchronization source corresponding to the first terminal is timing of the first base station. The first terminal implements synchronization with the first base station by receiving a primary synchronization signal (English full name: Primary Synchronization Signal, English abbreviation: PSS) and a secondary synchronization signal (English full name: Secondary Synchronization Signal, English abbreviation: SSS).

Similarly, the second terminal is synchronized with the second base station on which the second terminal camps, timing of a synchronization source corresponding to the second terminal is timing of the second base station, and the second terminal also implements synchronization with the second base station by using a PSS/SSS.

If a terminal is located out of a coverage area of a cellular network, but can receive a synchronization signal sent by a terminal located in the coverage area of the cellular network, a synchronization source for synchronizing the terminal located out of the coverage area of the cellular network and the terminal located in the coverage area of the cellular network is the terminal located in the coverage area of the cellular network (English full name: In-Coverage UE, English abbreviation: InC UE), for example, the first terminal. The fourth terminal may be synchronized with the first terminal by receiving an SLSS from the first terminal.

If a terminal is located out of a coverage area of a cellular network, but can receive timing forwarded by a terminal located out of the coverage area of the cellular network, a synchronization source for synchronizing the terminal located out of the coverage area of the cellular network and the terminal forwarding the timing is the terminal forwarding the timing (English full name: Out-of-Coverage (forwarding) network (timing) UE), English abbreviation: OoC_net UE), for example, the fourth terminal. The fifth terminal may be synchronized with the fourth terminal by receiving an SLSS from the fourth terminal.

If a terminal is located out of a coverage area of a cellular network, and detects no synchronization signal, or intensity of a detected synchronization signal is lower than a preset threshold, the terminal may send a synchronization signal while sending data. A synchronization source of the terminal located out of the coverage area of the cellular network is (English full name: Out-of-Coverage UE, English abbreviation: OoC UE).

Optionally, timing of a synchronization source corresponding to the fourth terminal may be a global navigation satellite system (English full name: Global Navigation Satellite System, English abbreviation: GNSS). Similarly, timing of a synchronization source corresponding to the fifth terminal may also be a GNSS.

A priority of the foregoing synchronization sources may be eNB>InC UE>OoC_net UE>OoC UE.

Figure 4:
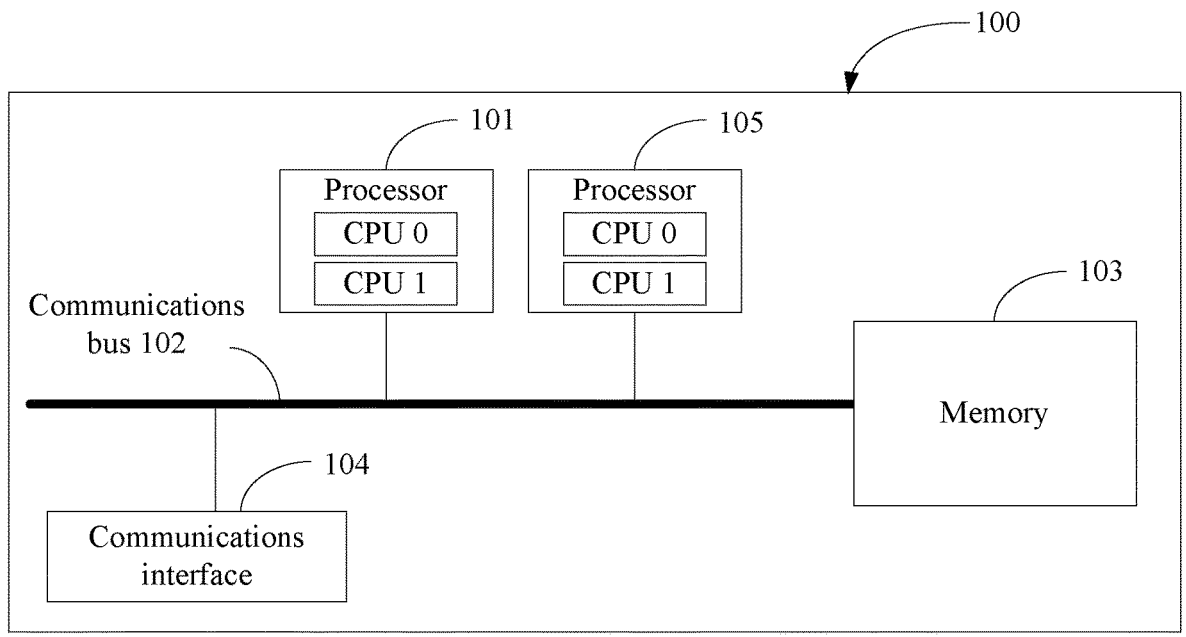
FIG. 4 is a schematic structural diagram of a computer device according to an embodiment of this application.

As shown in FIG. 4, a terminal in FIG. 3 may be implemented by a computer device (or system) in FIG. 4.

FIG. 4 is a schematic diagram of a computer device according to an embodiment of the present invention. The computer device 100 includes at least one processor 101, a communications bus 102, a memory 103, and at least one communications interface 104.

The processor 101 may be a processor, or may be a collective name of a plurality of processing elements. For example, the processor 101 may be a general-purpose central processing unit (English full name: Central Processing Unit, English abbreviation: CPU), may be an application-specific integrated circuit (English full name: application-specific integrated circuit, English abbreviation: ASIC), or may be one or more integrated circuits configured to control execution of programs of the solutions of the present invention, for example, one or more microprocessors (English full name: digital signal processor, English abbreviation: DSP), or one or more field programmable gate arrays (English full name: Field Programmable Gate Array, English abbreviation: FPGA).

In specific implementation, in an embodiment, the processor 101 may include one or more CPUs, such as a CPU 0 and a CPU 1 in FIG. 4.

In specific implementation, in an embodiment, the computer device 100 may include a plurality of processors, such as the processor 101 and a processor 105 in FIG. 4. Each of the processors may be a single-core (single-CPU) processor, or may be a multi-core (multi-CPU) processor. The processor herein may be one or more devices, a circuit, and/or a processing core configured to process data (such as a computer program instruction).

The communications bus 102 may be an industry standard architecture (English full name: Industry Standard Architecture, English abbreviation: ISA) bus, a Peripheral Component Interconnect (English full name: Peripheral Component, English abbreviation: PCI) bus, an extended industry standard architecture (English full name: Extended Industry Standard Architecture, English abbreviation: EISA) bus, or the like. The bus may be classified into an address bus, a data bus, a control bus, and the like. For ease of representation, only one bold line is used to represent the bus in FIG. 4, but this does not mean that there is only one bus or only one type of bus.

The memory 103 may be a read-only memory (English full name: read-only memory, English abbreviation: ROM), another type of static storage device that can store static information and instructions, a random access memory (English full name: random access memory, English abbreviation: RAM), or another type of dynamic storage device that can store information and instructions; or may be an electrically erasable programmable read-only memory (English full name: Electrically Erasable Programmable Read-Only Memory, English abbreviation: EEPROM), a compact disc read-only memory (English full name: Compact Disc Read-Only Memory, English abbreviation: CD-ROM) or another optical disk storage, an optical disc storage (including a compact optical disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. This does not constitute a limitation herein. The memory may exist independently and is connected to the processor by using the bus. Alternatively, the memory may be integrated with the processor.

The memory 103 is configured to store application program code for executing the solutions of the present invention, and the processor 101 controls execution of the application program code. The processor 101 is configured to execute the application program code stored in the memory 103.

The communications interface 104 is configured to communicate, by using any apparatus such as a transceiver, with another device or a communications network, such as Ethernet, a radio access network (RAN), a wireless local area network (English full name: Wireless Local Area Networks, English abbreviation: WLAN). The communications interface 104 may include a receiving unit to implement a receiving function, and a sending unit to implement a sending function.

In specific implementation, in an embodiment, the computer device 100 shown in FIG. 4 may be a terminal in FIG. 3.

The processor 101 is configured to obtain a starting offset, a transmission period, and a transmission duration for sending a first synchronization signal.

The communications interface 104 is configured to send, by the first terminal, the first synchronization signal within the transmission duration based on the starting offset and the transmission period.

The communications interface 104 is further configured to receive a system message sent by a base station.

The memory 103 is configured to store at least two starting offsets, at least two transmission periods, and at least two transmission durations.

Embodiment 1

Figure 5:
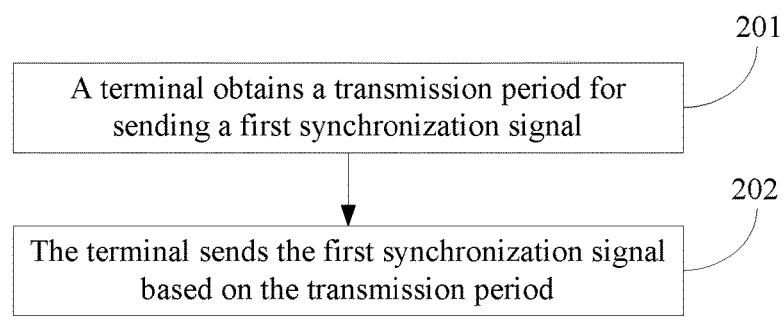
FIG. 5 is a flowchart of a terminal synchronization method according to an embodiment of this application.

This embodiment of the present invention provides a terminal synchronization method. As shown in FIG. 5, the method includes the following steps.

Step 201: A terminal obtains a transmission period for sending a first synchronization signal.

The transmission period is used to indicate a time interval between two adjacent synchronization signals sent by the terminal. The transmission period is a configurable period.

The terminal may obtain the transmission period for sending the first synchronization signal in the following two manners:

In one implementation, the terminal obtains, based on a priority of a first synchronization source corresponding to the first synchronization signal, a transmission period corresponding to the first synchronization source that is corresponding to the first synchronization signal. Synchronization sources with different priorities are corresponding to different transmission periods. A terminal selects a transmission period based on a priority of the terminal. For example, a high-priority synchronization source may use a relatively small transmission period, to obtain more transmission opportunities. Alternatively, the terminal obtains, based on a location of a first synchronization source corresponding to the first synchronization signal and/or a type of the first synchronization source, a transmission period corresponding to the first synchronization source that is corresponding to the first synchronization signal. For example, a synchronization source in a coverage area and a synchronization source out of the coverage area are corresponding to different transmission periods.

In the other implementation, the terminal randomly selects one transmission period from at least two transmission periods.

It should be noted that, when the terminal preconfigures the transmission period, the terminal may add the transmission period of the first synchronization signal to a physical sidelink broadcast channel (English full name: Physical Sidelink Broadcast Channel, English abbreviation: PSBCH) for transmission.

Step 202: The terminal sends the first synchronization signal based on the transmission period.

Figure 6:
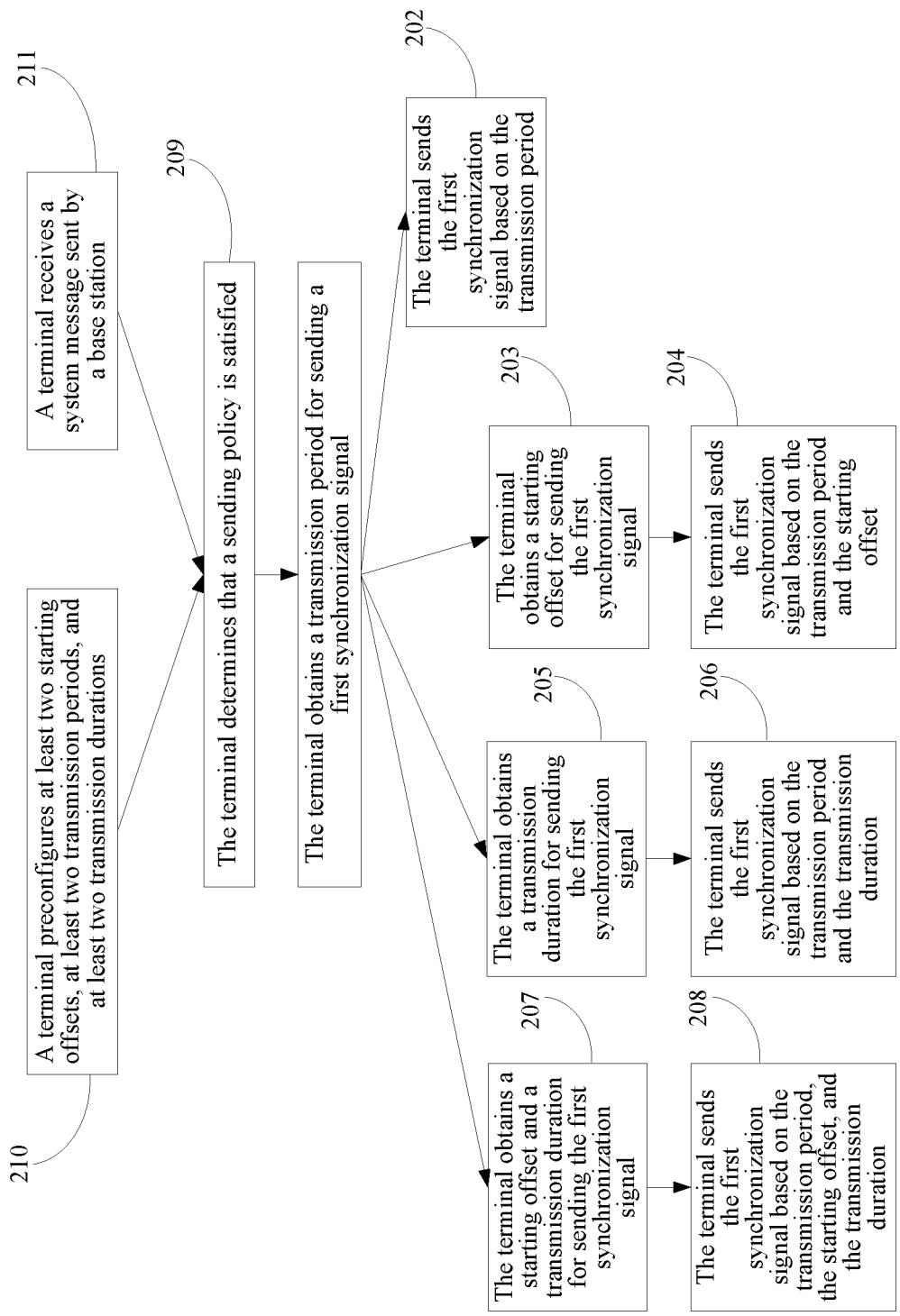
FIG. 6 is a flowchart of another terminal synchronization method according to an embodiment of this application.

Further, as shown in FIG. 6, before the terminal sends the first synchronization signal, for example, before step 202, the terminal may further obtain a starting offset and/or a transmission duration for sending the first synchronization signal. The starting offset is used to indicate an offset time period of a starting time point at which the terminal starts to send a synchronization signal. The transmission duration is used to indicate a duration in which the terminal sends a synchronization signal.

The terminal may perform step 203 and step 204, or perform step 205 and step 206, or perform step 207 and step 208.

Step 203: The terminal obtains a starting offset for sending the first synchronization signal.

Step 204: The terminal sends the first synchronization signal based on the transmission period and the starting offset.

Step 205: The terminal obtains a transmission duration for sending the first synchronization signal.

Step 206: The terminal sends the first synchronization signal based on the transmission period and the transmission duration.

Step 207: The terminal obtains a starting offset and a transmission duration for sending the first synchronization signal.

Step 208: The terminal sends the first synchronization signal based on the transmission period, the starting offset, and the transmission duration.

The terminal sends the first synchronization signal within the transmission duration based on the starting offset and the transmission period.

Specifically, the terminal may obtain the starting offset for sending the first synchronization signal in the following two manners:

In one implementation, the terminal obtains, based on a priority of a first synchronization source corresponding to the first synchronization signal, a starting offset corresponding to the first synchronization source that is corresponding to the first synchronization signal. Synchronization sources with different priorities are corresponding to different starting offsets. For example, a high-priority synchronization source may use a relatively small starting offset, to obtain more transmission opportunities. Alternatively, the terminal obtains, based on a location of a first synchronization source corresponding to the first synchronization signal and/or a type of the first synchronization source, a starting offset corresponding to the first synchronization source that is corresponding to the first synchronization signal. The starting offset may be a specific value, such as 10 ms, 20 ms, 30 ms, or 40 ms; or the starting offset may be any value from 0 to a maximum starting offset.

In the other implementation, the terminal randomly selects one starting offset from at least two starting offsets.

Specifically, the terminal may obtain the transmission duration for sending the first synchronization signal in the following two manners:

The terminal obtains, based on a priority of a first synchronization source corresponding to the first synchronization signal, a transmission duration corresponding to the first synchronization source that is corresponding to the first synchronization signal. Synchronization sources with different priorities are corresponding to different transmission durations. The terminal selects a transmission period based on a priority of a synchronization source. For example, a high-priority synchronization source may use a relatively long transmission time, to obtain more transmission opportunities. Alternatively, the terminal obtains, based on a location of a first synchronization source corresponding to the first synchronization signal and/or a type of the first synchronization source, a transmission duration corresponding to the first synchronization source that is corresponding to the first synchronization signal.

In the other implementation, the terminal randomly selects one transmission duration from at least two transmission durations.

It should be noted that, to help a terminal receiving the first synchronization signal determine the duration for sending the first synchronization signal, a remaining quantity of transmissions may be used for indication. The remaining quantity of transmissions may be added to a PSBCH. Each time the terminal sends the first synchronization signal, the remaining quantity of transmissions decreases by 1.

It should be noted that a priority of a synchronization source may be determined by a type of the synchronization source, for example, a GNSS, an eNB, or UE; or a priority of a synchronization source may be determined by a location of the synchronization source, for example, the synchronization source is in a coverage area or out of a coverage area; or a priority of a synchronization source may be determined by both a type and a location of the synchronization source; or a priority of a synchronization source may be defined by a base station.

In this way, in the present invention, a transmission period may be configured randomly, so that different terminals may send synchronization signals by using different transmission periods, and a terminal sends synchronization signals in a distributed manner, and controls a sequence for sending the synchronization signals. This avoids a conflict between synchronization signals sent by synchronization sources with different timing, and therefore terminals in a vehicle to vehicle communications system can have uniform timing at a same time point.

Figure 7:
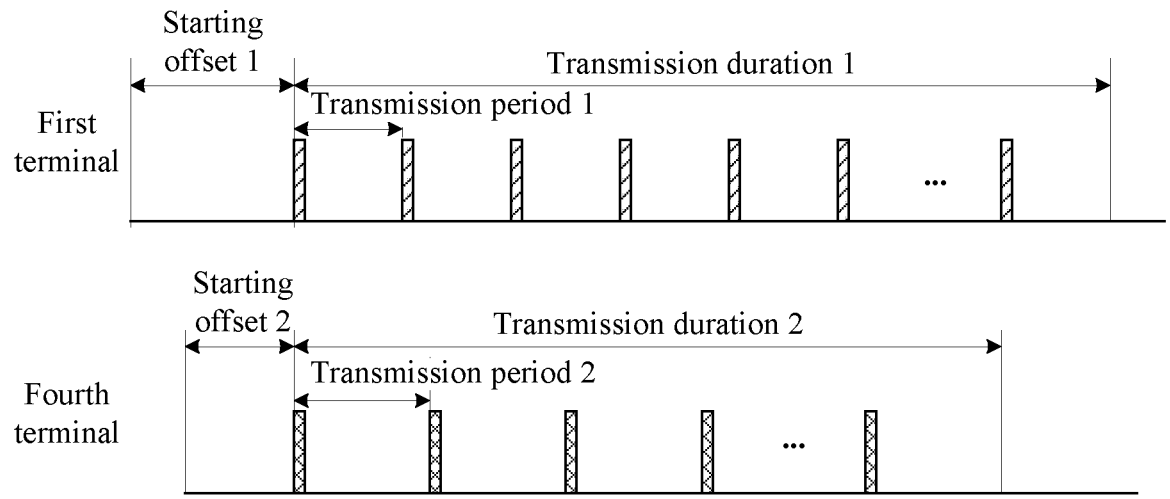
FIG. 7 is a schematic diagram of sending synchronization signals in a distributed manner according to an embodiment of this application.

For example, based on the first terminal and the fourth terminal in FIG. 3, as shown in FIG. 7, a schematic diagram of sending synchronization signals in a distributed manner is provided.

It is assumed that a priority of a first synchronization source that has been configured for the first terminal is higher than a priority of a second synchronization source that has been configured for the fourth terminal. After the first terminal and the fourth terminal each randomly select a starting offset, the first terminal periodically sends a first synchronization signal, and the fourth terminal periodically sends a second synchronization signal. A first first-synchronization-signal sent by the first terminal collides with a first second-synchronization-signal sent by the fourth terminal. However, a transmission period selected by the first terminal is less than a transmission period selected by the fourth terminal, and a transmission duration selected by the first terminal is greater than a transmission duration selected by the fourth terminal. Therefore, subsequently, a first synchronization signal sent by the first terminal does not collide with a second synchronization signal sent by the fourth terminal, so that different terminals may send synchronization signals in a distributed manner by using different parameters, including starting offsets, transmission periods, and transmission durations, and a terminal controls a sequence for sending synchronization signals. This avoids a conflict between synchronization signals sent by synchronization sources with different timing, and therefore terminals in a vehicle to vehicle communications system can have uniform timing at a same time point.

Particularly, the terminal may further receive an indication message sent by a base station, and the base station indicates the transmission period, the starting offset, and the transmission duration that are used by the terminal. The indication message is used to indicate at least one of the transmission period, the starting offset, and the transmission duration that are used by the terminal.

Further, before the transmission period for sending the first synchronization signal is obtained, namely, before step 201, based on FIG. 5 and FIG. 6, the method further includes the following specific steps.

Step 209: The terminal determines that a sending policy is satisfied.

The sending policy includes: The terminal does not detect any other synchronization signals within a preset time period; or signal strength of a detected synchronization signal of a synchronization source whose priority is not lower than a priority of the terminal is less than a preset threshold; or the terminal detects a second synchronization signal, and a priority of a second synchronization source corresponding to the second synchronization signal is lower than the priority of the first synchronization source corresponding to the first synchronization signal.

For example, when the terminal detects the second synchronization signal, and the priority of the second synchronization source corresponding to the second synchronization signal is lower than the priority of the first synchronization source corresponding to the first synchronization signal, the terminal determines to notify, by sending the first synchronization signal, another terminal of timing of the first synchronization source that has currently been configured for the terminal. For example, when the terminal detects that the priority of the second synchronization source corresponding to the second synchronization signal is lower than the priority of the first synchronization source corresponding to the first synchronization signal, and signal strength (for example, reference signal received power (English full name: Reference Signal Receiving Power, English abbreviation: RSRP)) of the received second synchronization signal exceeds a threshold, the terminal determines to notify, by sending the first synchronization signal, another terminal of timing of the first synchronization source that has currently been configured for the terminal. Usually, relatively large signal strength means that a terminal sending the signal is closer, and a danger coefficient of the terminal is higher. Optionally, the terminal may further determine, by using location information in a detected V2V signal, whether there is another terminal around the terminal. A priority of a synchronization source that has been configured for the another terminal is lower than a priority of a synchronization source that has been configured for the terminal. If it is determined, from the location information, that a distance between the another terminal and the terminal is less than a specific threshold (indicating that the another terminal and the terminal are relatively close), the terminal determines to notify, by sending the first synchronization signal, the another terminal of timing of the first synchronization source that has currently been configured for the terminal.

In still another case, the terminal may alternatively be instructed by the base station to send a synchronization signal.

Step 210: The terminal preconfigures at least two starting offsets, at least two transmission periods, and at least two transmission durations.

Step 211: The terminal receives a system message sent by a base station.

The system message includes at least two transmission periods, at least two starting offsets, and at least two transmission durations. The system message may be a system information block (English full name: System Information Block, English abbreviation: SIB) message.

Optionally, the terminal may alternatively configure a correspondence between a synchronization source, and a starting offset, a transmission period, and a transmission duration. For example, in a correspondence, one synchronization source may be corresponding to one or more starting offsets. Similarly, reference may be made to the starting offset, to establish a correspondence between a synchronization source, and a transmission period and a transmission duration. Further, the terminal may create a correspondence list, and the correspondence list includes a correspondence between at least two synchronization sources, and starting offsets, transmission periods, and two transmission durations.

It should be noted that the terminal may perform step 210 or step 211.

Further, after sending the first synchronization signal, the terminal may stop sending the current first synchronization signal. In one implementation, the transmission duration determined by the terminal ends, and the terminal stops sending the first synchronization signal. In another implementation, the terminal monitors a V2V channel; and when the terminal detects a third synchronization signal, and a priority of a synchronization source corresponding to the third synchronization signal is higher than the priority of the synchronization source corresponding to the first synchronization signal, the terminal immediately cancels sending the first synchronization signal; or after sending the first synchronization signal for several times, the terminal cancels sending the first synchronization signal, and sends the third synchronization signal.

The method steps shown in FIG. 5 may be specifically performed by the computer device shown in FIG. 4. For example, the method step of step 202 may be implemented by the communications interface 104. The method step of step 201 may be implemented by the processor 101.

It should be noted that, when the terminal includes a plurality of carriers, the terminal retains existing timing of the terminal on a primary carrier, for example, continues using GNSS timing, base station timing, or timing of the base station. Primary carriers allocated by base stations (which may belong to different operators) may be different, or may be the same but with different timing. A secondary carrier is a public carrier. On the secondary carrier, the terminal changes timing of the terminal based on the terminal synchronization method provided in the present invention.

Embodiment 2

Figure 8:
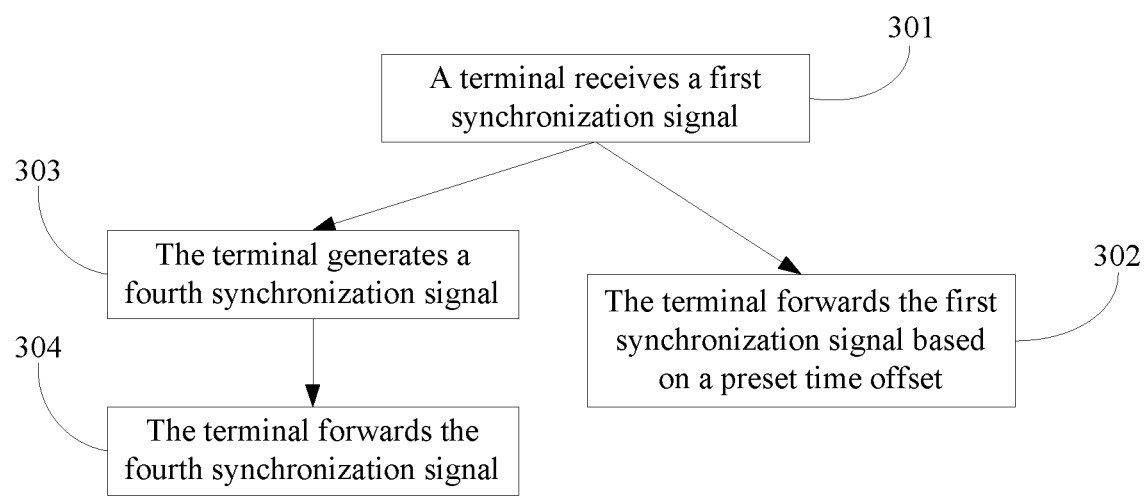
FIG. 8 is a flowchart of still another terminal synchronization method according to an embodiment of this application.

This embodiment of the present invention provides a terminal synchronization method. As shown in FIG. 8, the method includes the following steps.

Step 301: A terminal receives a first synchronization signal.

Step 302 or steps 303 and 304 is/are to be performed.

Step 302: The terminal forwards the first synchronization signal based on a preset time offset.

The time offset is used to indicate a difference between a time at which the terminal receives a synchronization signal and a time at which the terminal forwards the synchronization signal.

Figure 9:
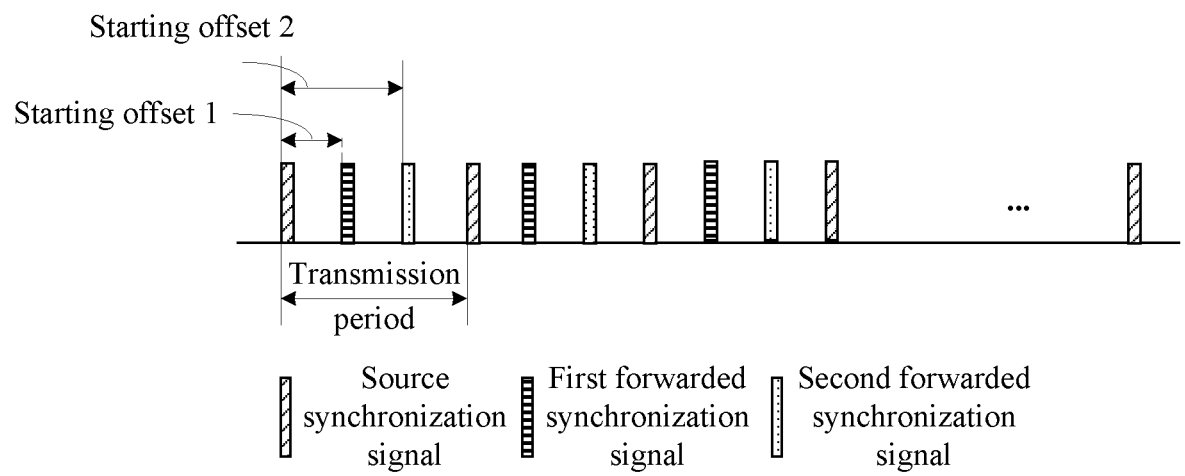
FIG. 9 is a schematic diagram of sending a synchronization signal according to an embodiment of this application.

For example, refer to FIG. 9.

It should be noted that a period for forwarding the first synchronization signal by the terminal may be a transmission period included in the first synchronization signal. To help a terminal at a receive end identify a quantity of times of forwarding, several bits (for example, 2 bits) may be added to a PSBCH to indicate the quantity of times of forwarding.

Step 303: The terminal generates a fourth synchronization signal.

A sequence of the fourth synchronization signal is different from a sequence of the first synchronization signal, and the fourth synchronization signal and the first synchronization signal are corresponding to same timing of a synchronization source.

Step 304: The terminal forwards the fourth synchronization signal.

In this way, after receiving a synchronization signal, the terminal waits for a specific time interval and then sends a synchronization signal, to differentiate the synchronization signal from the original synchronization signal, so that a terminal can identify the original synchronization signal and the forwarded synchronization signal.

Further, after the terminal sends a synchronization signal according to the terminal synchronization method in the present invention, a resource used to send a V2V signal may be allocated in the following manners:

In current 3GPP 36.xxx series standards, a physical sidelink shared channel (English full name: Physical Sidelink Shared Channel, English abbreviation: PSSCH) is defined as a resource for sending a V2V signal, and a PSBCH may carrier a PSSCH resource indication. However, at an initial synchronization stage, there may be a plurality of timing sources. If subframes in all synchronization signals carry resource allocation information, PSSCH resource out-of-synchronization may occur. Therefore, no PSSCH resource is allocated in several initial transmission periods. For example, a PSSCH resource starts to be allocated in a second or subsequent transmission period.

(a) A PSSCH resource is divided into several parts in an FDM or TDM manner, and is allocated to terminals with different timing for use.

(b) If the division is performed in the FDM manner, a guard band may be inserted between the parts; or if the division is performed in the TDM manner, a guard interval may be inserted between the parts.

To further reduce impact of an accumulative error in a timed transfer process and improve reliability of a synchronization solution, an extended CP may be used for an SLSS synchronization mechanism to eliminate impact of a timing error.

Embodiment 3

Figure 10:
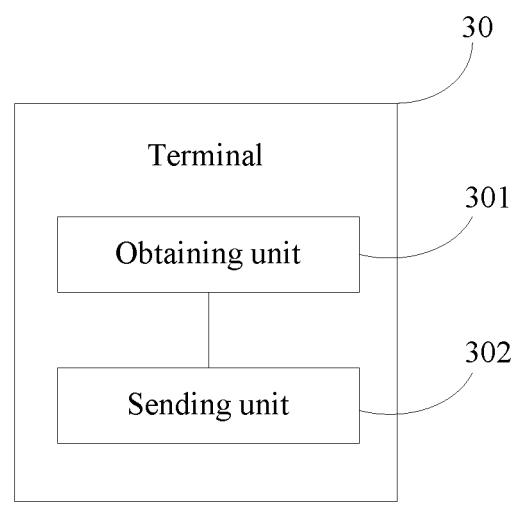
FIG. 10 is a schematic structural diagram of a terminal according to an embodiment of this application.

An embodiment of the present invention provides a terminal 30. As shown in FIG. 10, the terminal 30 includes: an obtaining unit 301, configured to obtain a transmission period for sending a first synchronization signal, where the transmission period is used to indicate a time interval between two adjacent synchronization signals sent by the terminal, and the transmission period is a configurable period; and a sending unit 302, configured to send the first synchronization signal based on the transmission period obtained by the obtaining unit.

In this way, a transmission period may be configured randomly, so that different terminals may send synchronization signals by using different transmission periods, and a terminal sends synchronization signals in a distributed manner, and controls a sequence for sending the synchronization signals. This avoids a conflict between synchronization signals sent by synchronization sources with different timing, and therefore terminals in a vehicle to vehicle communications system can have uniform timing at a same time point.

Figure 11:
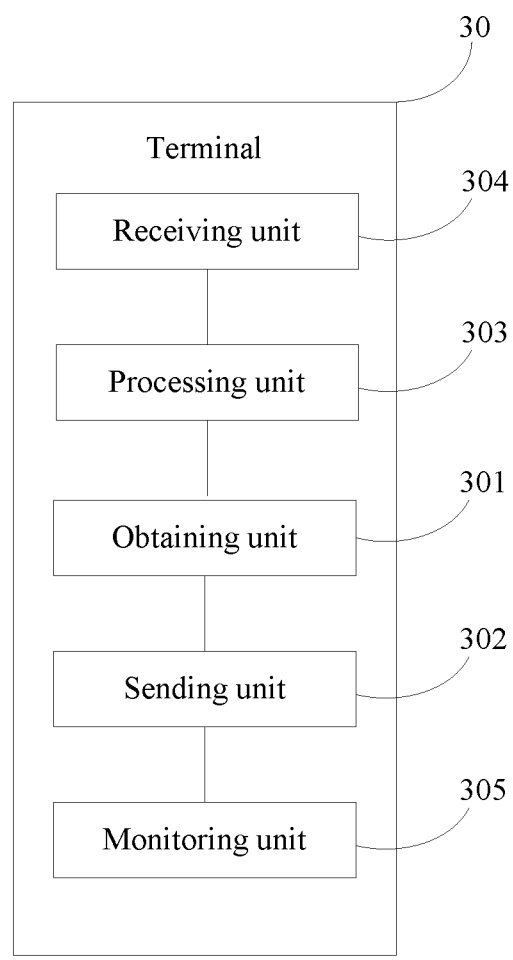
FIG. 11 is a schematic structural diagram of another terminal according to an embodiment of this application.

As shown in FIG. 11, the terminal 30 further includes: a processing unit 303, configured to determine that a sending policy is satisfied; a receiving unit 304, configured to receive a system message sent by a base station, where the system message includes at least two transmission periods, at least two starting offsets, and at least two transmission durations; and a monitoring unit 305, configured to monitor a vehicle to vehicle V2V channel within the starting offset.

In this embodiment, the terminal 30 is presented in a form of a function unit. Herein, the "unit" may be an application-specific integrated circuit (English full name: application-specific integrated circuit, English abbreviation: ASIC), a processor and a memory that execute one or more pieces of software or firmware programs, an integrated logic circuit, and/or another device that can provide the foregoing functions. In a simple embodiment, a person skilled in the art may figure out that the terminal 30 may be in the form shown in FIG. 10. The obtaining unit 301 and the sending unit 302 may be implemented by the computer device in FIG. 4. Specifically, the sending unit 302 may be implemented by the communications interface 104, and the obtaining unit 301 may be implemented by the processor 101.

In a scenario, if a terminal in a coverage area and a terminal out of the coverage area use different timing, a synchronization signal sent by the terminal out of the coverage area causes interference on the terminal in the coverage area. As shown in FIG. 3, it is assumed that the first base station configures and uses timing T1 of the first base station, the first terminal uses the timing T1 and is not synchronized with a GNSS, and the fourth terminal out of the coverage area preferentially uses timing T2 of the GNSS according to a current standard. In this case, an SLSS and a V2V signal that are sent by the fourth terminal cause interference on the first terminal in the coverage area.

Embodiment 4

Figure 12:
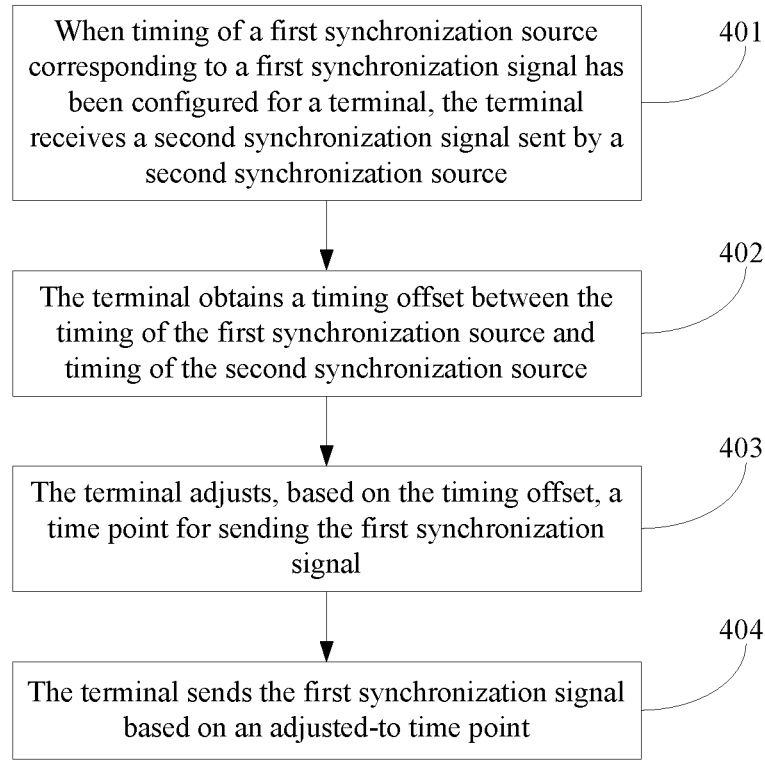
FIG. 12 is a flowchart of yet another terminal synchronization method according to an embodiment of this application.

This embodiment of the present invention provides a terminal synchronization method. As shown in FIG. 12, the method includes the following steps.

Step 401: When timing of a first synchronization source corresponding to a first synchronization signal has been configured for a terminal, the terminal receives a second synchronization signal sent by a second synchronization source.

The second synchronization signal is a signal of timing of the second synchronization source corresponding to the second synchronization signal.

Step 402: The terminal obtains a timing offset between the timing of the first synchronization source and timing of the second synchronization source.

Step 403: The terminal adjusts, based on the timing offset, a time point for sending the first synchronization signal.

Step 404: The terminal sends the first synchronization signal based on an adjusted-to time point.

The terminal adds the timing offset to a PSBCH for transmission.

In this way, the terminal sends a synchronization signal of a first terminal by adjusting, to received timing of a high-priority synchronization source, a time point for sending the synchronization signal, so as to reduce interference on a terminal in a coverage area caused by a timing offset.

Figure 13:
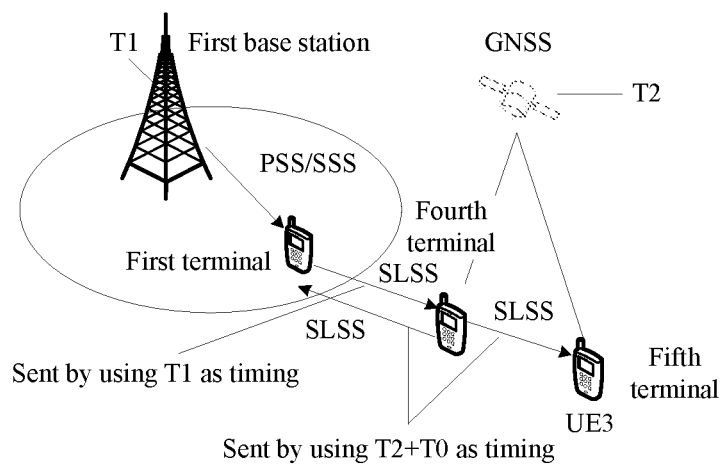
FIG. 13 is another schematic diagram of sending a synchronization signal according to an embodiment of this application.

As shown in FIG. 13, a fourth terminal detects timing T1 of a first base station and timing T2 of a GNSS, and measures a timing offset (Timing offset) between T1 and T2. There is a timing offset between T1 and T2, and the timing offset may be represented as T1−T2=To. When the fourth terminal needs to send a V2V signal (including an SLSS and a V2V message), the fourth terminal first adjusts, to T2+To, timing for sending the V2V signal by the fourth terminal. However, a synchronization source of the fourth terminal does not change, and the fourth terminal is still synchronized with the synchronization source GNSS. In this way, the synchronization source of the terminal does not change, relatively high synchronization precision can be maintained, and the interference on the terminal in the coverage area caused by the timing offset can also be reduced.

Further, after receiving the timing offset forwarded by the fourth terminal, a fifth terminal correspondingly adjusts sending timing of the fifth terminal and continues to forward the timing offset.

Embodiment 5

Figure 14:
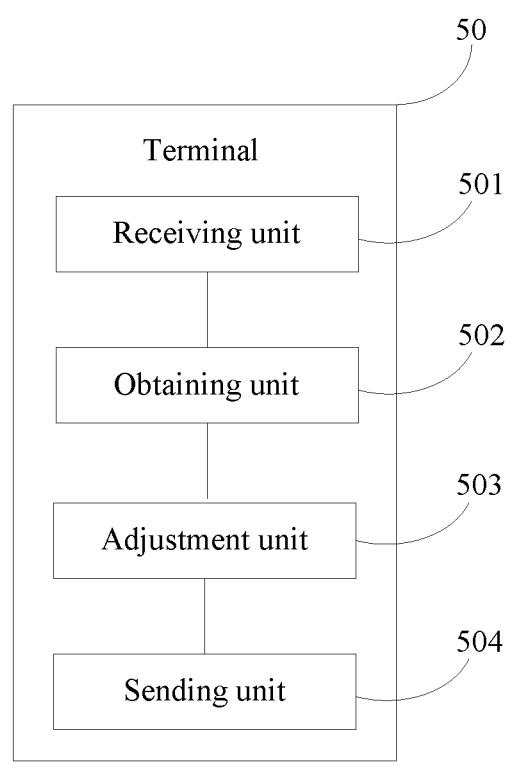
FIG. 14 is a schematic structural diagram of still another terminal according to an embodiment of this application.

An embodiment of the present invention provides a terminal 50. As shown in FIG. 14, the terminal 50 includes: a receiving unit 501, configured to: when timing of a first synchronization source corresponding to a first synchronization signal has been configured for the terminal, receive a second synchronization signal sent by a second synchronization source, where the second synchronization signal is a signal of timing of the second synchronization source corresponding to the second synchronization signal; an obtaining unit 502, configured to obtain a timing offset between the timing of the first synchronization source and the timing of the second synchronization source; an adjustment unit 503, configured to adjust, based on the timing offset, a time point for sending the first synchronization signal; and a sending unit 504, configured to send the first synchronization signal based on an adjusted-to time point.

In this embodiment, the terminal 50 is presented in a form of a function unit. Herein, the "unit" may be an application-specific integrated circuit (English full name: application-specific integrated circuit, English abbreviation: ASIC), a processor and a memory that execute one or more pieces of software or firmware programs, an integrated logic circuit, and/or another device that can provide the foregoing functions. In a simple embodiment, a person skilled in the art may figure out that the terminal 50 may be in the form shown in FIG. 14. The receiving unit 501 and the obtaining unit 502 may be implemented by the computer device in FIG. 4. Specifically, the receiving unit 501 may be implemented by the communications interface 104, and the obtaining unit 502 may be implemented by the processor 101.

Embodiment 6

Figure 15:
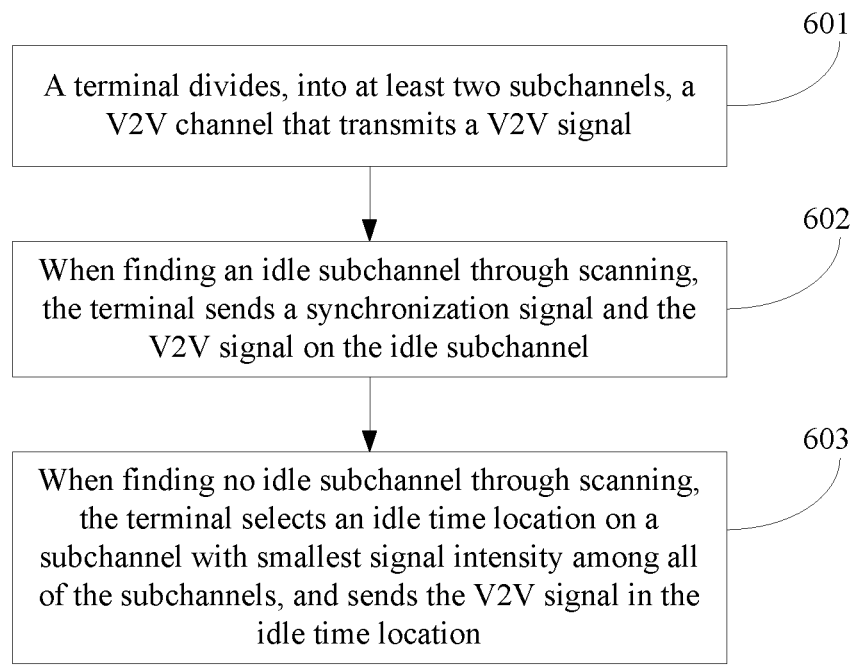
FIG. 15 is a flowchart of yet another terminal synchronization method according to an embodiment of this application.

This embodiment of the present invention provides a terminal synchronization method. As shown in FIG. 15, the method includes the following steps.

Step 601: A terminal divides, into at least two subchannels, a V2V channel that transmits a V2V signal.

Step 602: When finding an idle subchannel through scanning, the terminal sends a synchronization signal and the V2V signal on the idle subchannel.

The terminal scans each subchannel, and obtains energy intensity and/or density of carried signals and/or a signal distribution status on the subchannel. The signal distribution includes sending periods and timeslot locations of detected signals that come from different terminals.

Step 603: When finding no idle subchannel through scanning, the terminal selects an idle time location on a subchannel with smallest signal strength among all of the subchannels, and sends the V2V signal in the idle time location.

The V2V signal includes a synchronization signal.

Further, before sending the V2V signal, the terminal backs off for a preset time period. The preset time period for backoff may be determined based on an idle timeslot detected by the terminal. That is, signals are periodically sent, and signals sent by terminals are discrete in time. Therefore, the terminal may send a signal of the terminal in the idle timeslot. A backoff manner may be random backoff or priority-based backoff.

Figure 16:
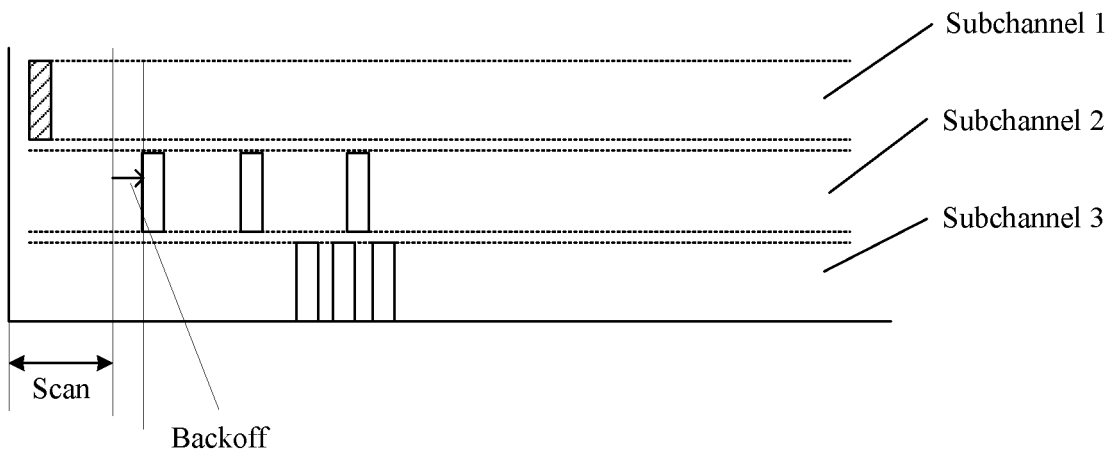
FIG. 16 is still another schematic diagram of sending a synchronization signal according to an embodiment of this application.

As shown in FIG. 16, an available spectrum resource is divided into three subchannels. Two of the subchannels, such as a subchannel 1 and a subchannel 2, are used for periodic message transmission. The other subchannel, such as a subchannel 3, is used for burst message transmission. At a scanning stage, the terminal finds that there is already V2V signal transmission on the subchannel 1, and the subchannel 2 is idle; therefore, the terminal selects the subchannel 2 for sending the V2V signal, and randomly backs off for a period of time before sending the V2V signal. In an example in FIG. 15, only one subchannel is configured for burst message transmission, and there is no subchannel selection process.

To implement synchronous transmission and reception on subchannels, a terminal at a receive end may be synchronized with a synchronization source with a highest priority based on a priority.

It should be noted that the foregoing scanning time may be configured by an eNB, may be a preset value, or may be randomly selected.

Embodiment 7

Figure 17:
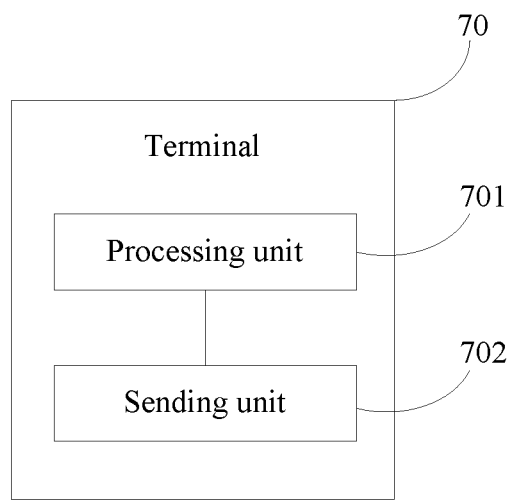
FIG. 17 is a schematic structural diagram of yet another terminal according to an embodiment of this application.

An embodiment of the present invention provides a terminal 70. As shown in FIG. 17, the terminal 70 includes: a processing unit 701, configured to divide, into at least two subchannels, a V2V channel that transmits a vehicle to vehicle V2V signal; and a sending unit 702, configured to: when the terminal finds an idle subchannel through scanning, send a synchronization signal and the V2V signal on the idle subchannel.

The sending unit 702 is further configured to: when the terminal finds no idle subchannel through scanning, select a subchannel with smallest signal strength from all of the subchannels, and send the V2V signal on the subchannel, where the V2V signal includes a synchronization signal.

In this embodiment, the terminal 70 is presented in a form of a function unit. Herein, the "unit" may be an application-specific integrated circuit (English full name: application-specific integrated circuit, English abbreviation: ASIC), a processor and a memory that execute one or more pieces of software or firmware programs, an integrated logic circuit, and/or another device that can provide the foregoing functions. In a simple embodiment, a person skilled in the art may figure out that the terminal 70 may be in the form shown in FIG. 17. The processing unit 701 and the sending unit 702 may be implemented by the computer device in FIG. 4. Specifically, the sending unit 702 may be implemented by the communications interface 104, and the processing unit 701 may be implemented by the processor 101.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (Read-Only Memory, ROM), a random access memory (Random Access Memory, RAM), a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by a terminal, wherein method comprises:
receiving, from a first synchronization source, a first synchronization signal, wherein the first synchronization signal is a first timing signal of the first synchronization source;
receiving, from a second synchronization source, a second synchronization signal, wherein the second synchronization signal is a second timing signal of the second synchronization source, and wherein receiving the second synchronization signal comprises receiving the second synchronization signal from a global navigation satellite system (GNSS);
adjusting, based on an offset, a time point for sending a sidelink synchronization signal to produce an adjusted time point; and
sending, based on the adjusted time point, the sidelink synchronization signal.

2. The method of claim 1, further comprising determining the offset as a timing offset between the first timing signal and the second timing signal.

3. The method of claim 1, wherein receiving the first synchronization signal comprises receiving the first synchronization signal from a base station.

4. The method of claim 1, further comprising adding the offset to a physical sidelink broadcast channel (PSBCH) for transmission.

5. The method of claim 1, further comprising sending the offset to another terminal to instruct the other terminal to adjust sending timing.

6. The method of claim 1, further comprising applying the terminal synchronization method to vehicle-to-vehicle (V2V) communications.

7. A terminal, comprising:
a communications interface configured to:
receive, from a first synchronization source, a first synchronization signal, wherein the first synchronization signal is a first timing signal of the first synchronization source;
receive, from a second synchronization source, a second synchronization signal, wherein the second synchronization signal is a second timing signal of the second synchronization source, and wherein the second synchronization source is a global navigation satellite system (GNSS); and
send, based on an adjusted time point, a sidelink synchronization signal; and
one or more processors coupled to the communications interface and configured to adjust, based on an offset, a time point for sending the sidelink synchronization signal to produce the adjusted time point.

8. The terminal of claim 7, wherein the offset is a timing offset between the first timing signal and the second timing signal.

9. The terminal of claim 7, wherein the first synchronization source is a base station.

10. The terminal of claim 7, wherein the one or more processors are further configured to add the offset to a physical sidelink broadcast channel (PSBCH) for transmission.

11. The terminal of claim 7, wherein the communications interface is further configured to send the offset to another terminal.

12. The terminal of claim 7, wherein the terminal is a vehicle-to-vehicle terminal.

13. A computer program product comprising instructions stored on a non-transitory computer-readable medium that, when executed by one or more processors, cause a terminal to:
receive, from a first synchronization source, a first synchronization signal, wherein the first synchronization signal is a first timing signal of the first synchronization source;

receive, from a second synchronization source, a second synchronization signal, wherein the second synchronization signal is a second timing signal of the second synchronization source, and wherein the second synchronization source comprises a global navigation satellite system (GNSS);

adjust, based on an offset, a time point for sending a sidelink synchronization signal to produce an adjusted time point; and send, based on the adjusted time point, the sidelink synchronization signal.

14. The computer program product of claim 13, wherein the offset is a timing offset between the first timing signal and the second timing signal.

15. The computer program product of claim 13, wherein the first synchronization source is a base station.

16. The computer program product of claim 13, wherein the instructions further cause the terminal to add the offset to a physical sidelink broadcast channel (PSBCH) for transmission.

17. The computer program product of claim 13, wherein the instructions further cause the terminal to send the offset to another terminal.

18. The method of claim 1, wherein the offset is between the first timing signal and the second timing signal.

19. The terminal of claim 7, wherein the offset is between the first timing signal and the second timing signal.

20. The computer program product of claim 13, wherein the offset is between the first timing signal and the second timing signal.

* * * * *

UNITED STATES PATENT AND TRADEMARK OFFICE
CERTIFICATE OF CORRECTION

PATENT NO. : 11,844,036 B2
APPLICATION NO. : 17/882847
DATED : December 12, 2023
INVENTOR(S) : Yongbo Zeng et al.

It is certified that error appears in the above-identified patent and that said Letters Patent is hereby corrected as shown below:

On the Title Page

Page 2, item (56): "CN 2015026544 A2 2/2015" should read "WO 2015026544 A2 2/2015"

Page 2, item (56): "CN 2015065017 A1 5/2015" should read "WO 2015065017 A1 5/2015"

In the Claims

Claim 6, Column 20, Line 26: "terminal synchronization method to" should read "method to"

Signed and Sealed this
Sixteenth Day of January, 2024

Katherine Kelly Vidal
*Director of the United States Patent and Trademark Office*